Patented Mar. 19, 1935

1,995,219

UNITED STATES PATENT OFFICE 1,995,219

POLISHING COMPOSITION AND PROCESS OF MANUFACTURING SAME

Louis Friedrich Wilhelm Pape, Dusseldorf-Benrath, Germany, assignor to the firm Henkel & Cie. Gesellschaft mit beschränkter Haftung, Dusseldorf, Germany No Drawing. Application December 15, 1931, Serial No. 581,278. In Germany January 22, 1931

5 Claims. (Cl. 134—24)

Polishing compositions are usually produced from paraffin and also from waxes, i. e. esters of wax alcohols with wax acids. The esterified constituents waxes of this kind sometimes also contain small amounts of free acids. These acids were hitherto regarded as objectionable foreign matter and for this reason waxes having a higher acid number were never used for preparing polishing masses.

I have now made the surprising discovery, that said free acids in no way impair polishing compositions, but that on the contrary polishing compositions of excellent qualities are obtained, if large amounts of unsaponified wax acids are introduced into the same respectively, provided free unsaponified wax acids form the chief constituent of the said masses. For example polishing masses of this kind may be produced by melting wax acids and adding a solvent or a solvent mixture to the melted mass. If necessary, an emulsifier is also added. The addition of an emulsifier is particularly to be recommended when water is present.

The production of the polishing masses can be carried out with natural wax acids and also with artificially produced acids having a wax character. As solvents, fluids may be used which are commonly employed in the preparation of polishing compositions, such, for example, as turpentine oil, sangajol and the like. Wax soaps, organic sulfonic acids, salts of sulfonic acids and similar substances are good emulsifiers. Usually only very small amounts of emulsifiers are needed.

The novel polishing masses may of course contain in addition to the wax acids, substances which are present in polishing waxes of known kind, such, for example, as paraffin, waxes and the like. The wax acids must however be present in predominating amounts.

Example 1

35 kg. of carnaubic acid and 5 kg. of ozokerite are melted and to the melted mass 0.75 kg. of Turkey-red oil are added while stirring. Thereupon 160 kg. of oil of turpentine and subsequently 1.3 kg. of a 50% solution of potassium hydroxide are allowed to flow in slowly. A small portion of the carnaubic acid is saponified by the potassium hydroxide. Due to the presence of the small quantities of emulsifiers (wax soap and Turkey red oil) a homogeneous composition is obtained after running the molten mass into the containers. Bodies (floors and the like) polished with this mass will acquire a high-glaze surface.

Example 2

65 kg. of carnaubic acid, 10 kg. of ozokerite and 5 kg. of beeswax are melted together and to the melted mass an aqueous solution of 0.5 kg. of isopropyl naphthaline sulfonic acid, which have been dissolved hot in 350 kg. of water is added. To this mass 90 kg. of oil of turpentine and finally 3 kg. of a 50% solution of potassium hydroxide are added while stirring the mass. The mass which is obtained by this treatment is homogeneous and imparts a high polish to the bodies which are treated with it.

The carnaubic acid may be replaced by wax acids obtained from the Montan wax industry or by other wax-like acids obtained from natural or artificial products.

As before mentioned, the new polishing waxes impart a very good polish to the surfaces which are treated with them. Due to their weak acid character, they are particularly suitable for the treatment of linoleum compositions, which as is known are unable to withstand alkaline treatment. The solvents volatilize very rapidly from the composition after application, so that the treated surfaces can be polished immediately after the application of the composition, instead after the lapse of a considerable time for drying as necessitated hitherto.

Of course, the new polishing compositions can also be prepared by other known processes for the manufacture of polishing compositions, apart from the process described above.

The new polishing compositions may be manufactured in solid or liquid form and are particularly well adapted for production in the form of cream or paste.

The term "wax-like substances" as employed in the specification and claims is intended to designate both artificial and natural waxes.

I claim:

1. A process of manufacturing polishing compositions, comprising the steps of melting a charge comprising free unsaponified wax acids of the group consisting of carnaubic and Montanic acids as the predominating constituent and other wax-like substances and adding solvents to the molten mass.

2. A process of manufacturing polishing compositions, comprising the steps of melting a charge comprising free unsaponified wax acids of the group consisting of carnaubic and Montanic acids as the predominating constituent and other wax like substances and adding emulsifiers and solvents to the molten mass.

3. A process of manufacturing polishing compositions, comprising the steps of melting a charge comprising free unsaponified wax acids of the group consisting of carnaubic and Montanic acids as the predominating constituent and other wax-like substances, adding an emulsifier while stirring, adding a solvent and finally adding such a solution of potassium hydroxide to saponify only a portion of the free wax acids that the amount of still present unsaponified wax acids forms more than half of the solid compounds.

4. A polishing composition, containing as the predominant constituent free unsaponified wax acids of the group consisting of carnaubic and Montanic acids.

5. A polishing composition, containing as the predominant constituent free unsaponified wax acids of the group consisting of carnaubic and Montanic acids and also containing other wax-like substances and emulsifiers.

LOUIS FRIEDRICH WILHELM PAPE.